(12) United States Patent
Harmon et al.

(10) Patent No.: US 12,269,326 B2
(45) Date of Patent: Apr. 8, 2025

(54) AUTONOMOUS VEHICLE CONFIGURABLE FOR TRANSPORTATION OF PASSENGERS AND CARGO

(71) Applicant: Ford Global Technologies, LLC, Dearborn, MI (US)

(72) Inventors: Michael John Harmon, Westland, MI (US); Robert Walker, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/405,374

(22) Filed: Jan. 5, 2024

(65) Prior Publication Data

US 2024/0140281 A1    May 2, 2024

Related U.S. Application Data

(62) Division of application No. 17/241,276, filed on Apr. 27, 2021, now Pat. No. 11,904,742.

(51) Int. Cl.
*B60J 5/02*    (2006.01)
*B60J 5/06*    (2006.01)
(Continued)

(52) U.S. Cl.
CPC . *B60J 5/06* (2013.01); *B60J 5/02* (2013.01); *B60J 5/103* (2013.01); *B60P 1/435* (2013.01); (Continued)

(58) Field of Classification Search
CPC ....... B60J 5/02; B60J 5/06; B60J 5/062; B60J 5/105; B60J 5/102; B60J 5/12; B60J 5/125; B60J 5/0477; B60J 5/0479; B60J 5/0493; B60J 1/20; B60R 2011/0021; B60R 2011/004; B60P 1/435
(Continued)

(56) References Cited

U.S. PATENT DOCUMENTS 2,306,334 A    12/1942  Costas
5,398,987 A *   3/1995  Sturgis ............ B60R 9/00
                                         224/404
(Continued)

FOREIGN PATENT DOCUMENTS

CN    203724352 U    7/2014
CN    111806310 A   10/2020
(Continued)

OTHER PUBLICATIONS

Lee (KR 19990011366 U), machine translation (Year: 1999).*
(Continued)

*Primary Examiner* — Amy R Weisberg
*Assistant Examiner* — Wenwei Zhuo
(74) *Attorney, Agent, or Firm* — Vichit Chea; Carlson, Gaskey & Olds, P.C.

(57) ABSTRACT

This disclosure relates to an autonomous vehicle configurable for transportation of either passengers, cargo, or both. The various aspects of this disclosure, which include moveable seat assemblies, a door arrangement, and storage bins, among other things, provide the vehicle with increased functionality and versatility, leading to more efficient vehicle use.

9 Claims, 9 Drawing Sheets

(51) Int. Cl.
  *B60J 5/10* (2006.01)
  *B60P 1/43* (2006.01)
  *B60N 2/10* (2006.01)
  *B60N 2/64* (2006.01)
  *B60N 2/68* (2006.01)
  *B60N 2/80* (2018.01)
(52) U.S. Cl.
  CPC ............... *B60J 5/105* (2013.01); *B60N 2/10* (2013.01); *B60N 2/64* (2013.01); *B60N 2/68* (2013.01); *B60N 2/80* (2018.02)
(58) Field of Classification Search
  USPC .... 296/155, 147, 146.4, 146.8, 56, 57.1, 51, 296/61, 146.12
  See application file for complete search history.

(56) References Cited

U.S. PATENT DOCUMENTS

| | | | |
|---|---|---|---|
| 6,447,051 B1* | 9/2002 | Lukomskiy | B60P 3/40 296/183.1 |
| 6,955,386 B2 | 10/2005 | Rhodes et al. | |
| 7,121,612 B2 | 10/2006 | Rasmussen | |
| 7,559,594 B2 | 7/2009 | McMillen | |
| 9,849,843 B2* | 12/2017 | Kogut | B60R 11/06 |
| 10,967,802 B2* | 4/2021 | Sabdad | B60R 11/00 |
| 11,541,733 B2* | 1/2023 | Rampalli | B60J 5/02 |
| 2004/0160104 A1 | 8/2004 | Mukoujima et al. | |
| 2008/0284214 A1 | 11/2008 | Neale | |
| 2014/0054339 A1* | 2/2014 | Smith | B60P 3/14 224/404 |
| 2016/0311478 A1 | 10/2016 | Amiri | |
| 2017/0350171 A1* | 12/2017 | Marasco | E05B 83/22 |
| 2019/0050807 A1 | 2/2019 | Ferguson et al. | |
| 2019/0135349 A1* | 5/2019 | Nusier | B60J 5/06 |
| 2020/0047692 A1 | 2/2020 | Park et al. | |
| 2020/0062097 A1* | 2/2020 | Hara | B60K 1/00 |
| 2020/0247302 A1 | 8/2020 | Buttolo et al. | |
| 2021/0146807 A1* | 5/2021 | Wood | B60N 2/206 |
| 2021/0304127 A1* | 9/2021 | Yamamoto | B60R 11/00 |
| 2022/0063505 A1* | 3/2022 | Salter | B60R 7/046 |
| 2023/0031513 A1* | 2/2023 | Hans Wolfgang Coester | B60J 9/02 |

FOREIGN PATENT DOCUMENTS

| | | | | |
|---|---|---|---|---|
| DE | 19628699 A1 | | 1/1998 | |
| DE | 19641255 A1 | * | 4/1998 | ............... B60J 5/02 |
| DE | 102014215205 A1 | | 4/2016 | |
| EP | 2303630 B1 | | 4/2011 | |
| EP | 3375660 A1 | | 9/2018 | |
| GB | 2510947 A | | 8/2014 | |
| KR | 19990011366 U | * | 3/1999 | |
| KR | 20080072302 A | * | 8/2008 | |
| WO | WO-2022058037 A1 | * | 3/2022 | ............... B60J 5/02 |

OTHER PUBLICATIONS

Rosenkranz (DE 19641255 A1), machine translation (Year: 1998).*
"BMW Isetta Specs & Photos—1955, 1956, 1957, 1958, 1959, 1960, 1961, 1962." Autoevolution, www.autoevolution.com/cars/bmw-isetta-1955.html.

* cited by examiner

AUTONOMOUS VEHICLE CONFIGURABLE FOR TRANSPORTATION OF PASSENGERS AND CARGO

RELATED APPLICATIONS

This application is a divisional of prior U.S. application Ser. No. 17/241,276, filed Apr. 27, 2021, the entirety of which is herein incorporated by reference.

TECHNICAL FIELD

This disclosure relates to an autonomous vehicle configurable for transportation of either passengers, cargo, or both.

BACKGROUND

There are various levels of autonomous vehicles. Fully autonomous vehicles do not require a driver at all, and instead use a self-driving system (SDS), which includes sensors, cameras, radar, etc., to sense its surroundings and guide itself between destinations without a human operator. Fully autonomous vehicles are being developed for use in on-demand transportation of passengers, such as in ridesharing or shuttle applications, and for use in transporting cargo, including physical items like packages, groceries, etc., for delivery from one place to another.

SUMMARY

A vehicle according to an exemplary aspect of the present disclosure includes, among other things, an interior space between a floor and a ceiling vertically spaced-apart from the floor, and a seat assembly configurable between a seating position in which the seat assembly provides at least one seat and a stowed position in which the seat is stowed adjacent the ceiling. The seat assembly is configured such that moving the seat assembly from the seating position to the stowed position includes raising the seat along a linear path of movement.

In a further non-limiting embodiment of the foregoing vehicle, the seat includes a seat base and a seat back moveable relative to the seat base such that, in the seating position, a user may sit on the seat and, in the stowed position, the seat back is substantially parallel to the seat base.

In a further non-limiting embodiment of any of the foregoing vehicles, the seat assembly is configured such that moving the seat back from the upright position to a folded position includes pivoting and sliding the seat back relative to the seat base.

In a further non-limiting embodiment of any of the foregoing vehicles, the seat assembly includes a frame supporting the seat base and the seat back, and the frame includes a moveable stand configured to contact the floor in the seating position and to cover a portion of the seat in the stowed position.

In a further non-limiting embodiment of any of the foregoing vehicles, the seat includes a headrest connected to the seat back, and when the seat is in the folded position and the stand is in the cover position, the stand covers at least a portion of the headrest.

In a further non-limiting embodiment of any of the foregoing vehicles, the vehicle includes a lift assembly configured to lift the seat assembly along the linear path of movement. The lift assembly includes a shaft having a central axis arranged along the linear path of movement, and a carriage connected to the seat assembly and configured to travel along the shaft.

In a further non-limiting embodiment of any of the foregoing vehicles, the shaft is threaded and rotation of the shaft results in movement of both the carriage and the seat assembly along the linear path of movement.

In a further non-limiting embodiment of any of the foregoing vehicles, the shaft is rotatable by a motor, wherein the motor is configured to selectively alternate between engaging the shaft and engaging a drive wheel of the vehicle.

In a further non-limiting embodiment of any of the foregoing vehicles, a ceiling of the vehicle includes a raised section providing the interior space with an increased height dimension relative to a remainder of the ceiling, and when the seat assembly is in the stowed position, the seat assembly is arranged substantially within the raised section.

In a further non-limiting embodiment of any of the foregoing vehicles, the seat assembly includes a plurality of seats.

In a further non-limiting embodiment of any of the foregoing vehicles, the seat assembly is one of a plurality of seat assemblies within the interior space.

A vehicle according to another exemplary aspect of the present disclosure includes, among other things, a body including a front, a rear, and opposed first and second sides extending between the front and the rear. The front of the body has a front opening, the rear of the body has a rear opening, the first side has a first side opening, and the second side has a second side opening. Further, an interior space is within the body, a front door configured to open and close relative to the front opening, a rear door configured to open and close relative to the rear opening, a first side door configured to open and close relative to the first side opening, and a second side door configured to open and close relative to the second side opening.

In a further non-limiting embodiment of the foregoing vehicle, the vehicle includes a controller configured to command each of the front door, the rear door, and the first and second side doors to open in response to a single input.

In a further non-limiting embodiment of any of the foregoing vehicles, the front door and the rear door are each provided by one panel pivotably attached adjacent a roof of the vehicle.

In a further non-limiting embodiment of any of the foregoing vehicles, the front door and the rear door are each provided by a first panel pivotably attached adjacent a roof of the vehicle and a second panel pivotably attached adjacent a floor of the vehicle.

In a further non-limiting embodiment of any of the foregoing vehicles, when the front and rear doors are open, each of the second panels is configured to provide an inclined ramp between the ground surface and the interior space.

In a further non-limiting embodiment of any of the foregoing vehicles, the first side door and the second side door are each provided by first and second panels configured to slide away from one another to open a respective one of the first and second doors.

In a further non-limiting embodiment of any of the foregoing vehicles, a plurality of storage bins incorporated into one or more of the front door, rear door, and first and second side doors, wherein the storage bins are configured to hold items and are further configured such that an item in the storage bin is accessible from an exterior of the vehicle.

In a further non-limiting embodiment of any of the foregoing vehicles, the vehicle includes a display system including a front display screen mounted to the front door, a rear display screen mounted to the rear door, a first side display screen mounted to the first side door, and a second side display screen mounted to the second side door. The display system is configured to indicate to a user which one of the storage bins is associated with the user.

In a further non-limiting embodiment of any of the foregoing vehicles, each of the front door, rear door, and first and second side doors includes a plurality of storage bins.

BRIEF DESCRIPTION OF THE DRAWINGS

The drawings illustrate various views of an example autonomous vehicle. In some drawings, doors are removed for ease of reference. Further, some drawings illustrate various portions of the vehicle as translucent for ease of reference. The terms "front" and "rear" are used below for ease of reference only and are not otherwise limiting.

DETAILED DESCRIPTION

This disclosure relates to an autonomous vehicle configurable for transportation of either passengers, cargo, or both. The various aspects of this disclosure, which include moveable seat assemblies, a door arrangement, and storage bins, among other things, provide the vehicle with increased functionality and versatility, leading to more efficient vehicle use. These and other benefits will be appreciated from the below description.

Figure 1:
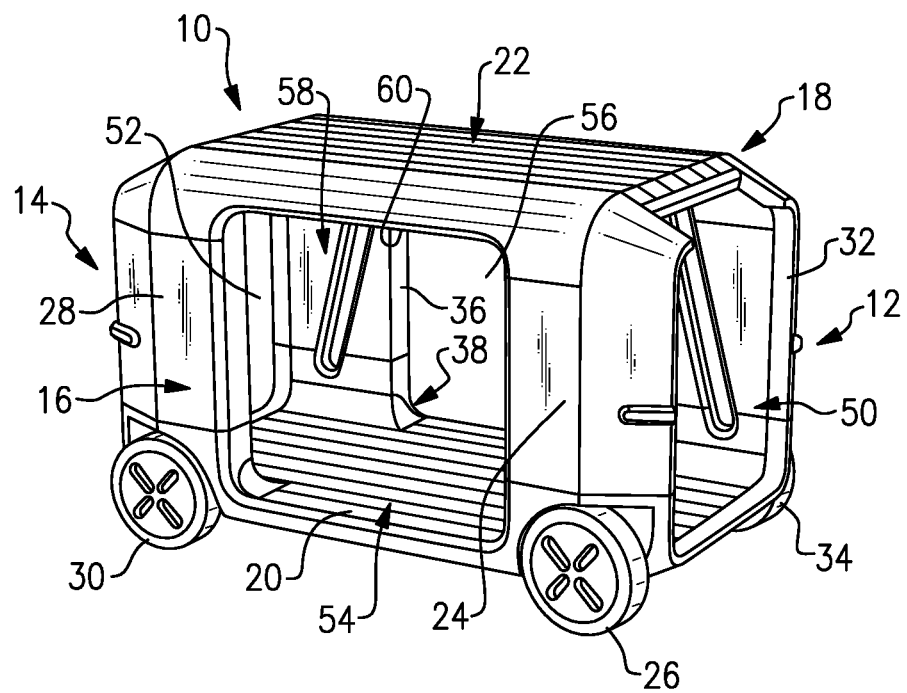
FIG. 1 is a front-perspective view of an example autonomous vehicle.

Referring to the drawings, FIG. 1 is a view of an example autonomous 10 ("vehicle 10"), which in particular is a fully autonomous vehicle configured to sense its surroundings and control and guide itself between destinations without a human operator. The vehicle 10 includes a self-driving system (SDS), various components of which will be discussed below. The example vehicle 10 is classified as a "Level 5" autonomous vehicle under the ranking system published by the Society of Automotive Engineers (SAE). While a particular vehicle 10 is shown, this disclosure is not limited to any particular vehicle type, and extends to other types of autonomous vehicles, including autonomous cars, vans, trucks, and sport utility vehicles, as examples. The vehicle 10 may be for on-demand transportation of passengers, such as in ridesharing or shuttle applications, and for use in transporting cargo.

FIG. 1 illustrates the vehicle 10 with the doors of the vehicle 10 removed. The vehicle 10 includes a first end 12, a second end 14 opposite the first end 12 and connected to the first end 12 by opposed first and second sides 16, 18 extending along sides of the vehicle 10. In this example, the first end 12 may be referred to as a "front" of the vehicle 10 and the second end 14 may be referred to as a "rear" of the vehicle 10. However, the vehicle 10 may able to travel in both directions, and thus the second end 14 could be referred to as the "front" and the first end 12 could be referred to as the "rear."

The vehicle 10 lacks steering controls, such as a steering wheel, which are found in traditional driver-operated vehicles and which ordinarily may be used to indicate the front of a vehicle. In other words, the vehicle 10 is substantially symmetrical about its centerline, which extends parallel to and between the first and second opposed sides 16, 18, and is also substantially symmetrical about a plane bisecting the vehicle 10 and extending between and parallel to the first and second ends 12, 14.

The vehicle 10 includes a floor 20 and a roof 22 spaced-apart vertically above the floor 20 by four pillars, in this example. With reference to the first side 16, the vehicle 10 includes a first pillar 24 adjacent the first end 12 and aligned substantially vertically above a first vehicle drive wheel 26. Adjacent the second end 14, the vehicle 10 includes a second pillar 28 aligned substantially vertically above a second vehicle drive wheel 30. Likewise, the second side 18 includes a third pillar 32 adjacent the first end 12 and aligned substantially vertically above a third vehicle drive wheel 34, and, adjacent the second end 14, the vehicle 10 includes a fourth pillar 36 aligned substantially vertically above a fourth vehicle drive wheel 38.

Figure 2:
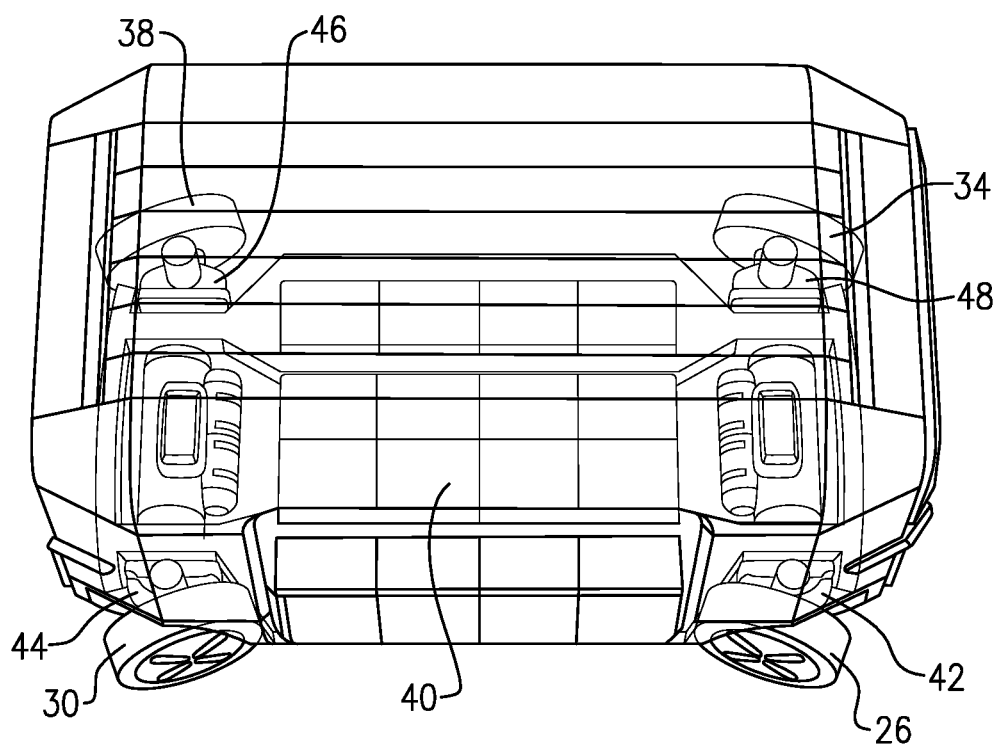
FIG. 2 is a top-perspective view of the vehicle of FIG. 1.

The vehicle 10 in this example is a battery electric vehicle (BEV) and lacks a traditional internal combustion engine. The vehicle 10 includes a battery pack 40 (FIG. 2) arranged beneath the floor 20. The battery pack 40 is configured to deliver power to a plurality of motors, which in this example includes four motors 42, 44, 46, 48, each configured to drive a respective one of the vehicle drive wheels 26, 30, 34, 38. The vehicle drive wheels 26, 30, 34, 38 are controlled by the SDS and are steerable by various actuators controlled by the SDS. The vehicle 10 is able to drive and steer each of the vehicle drive wheels 26, 30, 34, 38 independently, which increases the ease of maneuvering the vehicle 10.

The spacing of the pillars 24, 28, 32, 36 coupled with the absence of a traditional internal combustion engine permits some configurations of the vehicle 10 to have four ingress and egress openings for use by either passengers or cargo, or both. In particular, between pillars 24, 32, the first end 12 of the body of the vehicle 10 includes a first opening 50 (FIG. 1). Opposite the first opening 50, the second end 14 of the body of the vehicle 10 includes a second opening 52 between pillars 28, 36. Neither of the openings 50, 52 are obstructed by an engine, as would be the case in traditional vehicles, such as those which include an internal combustion engine. Further, the first side 16 includes a third opening 54 between pillars 24, 28, and the second side 18 includes a fourth opening 56 opposite the third opening 54 and between pillars 32, 36. Each of the openings 50, 52, 54, 56 extends substantially from the floor 20 to the roof 22. In this way, the openings 50, 52, 54, 56 provide ample room for passengers and cargo to enter an interior 58 of the vehicle 10 via any of the openings 50, 52, 54, 56.

The interior 58, in this example, is bound by the first and second ends 12, 14, the first and second sides 16, 18, the floor 20, and an underside of the roof 22, which provides a ceiling 60. In FIG. 1, there are no seats shown within the interior 58. However, in an aspect of this disclosure, the vehicle 10 includes seat assemblies which are configured to move between a seating position, in which the seat assemblies are useable as seats for passengers, and a stowed position, in which the seat assemblies are moved into a position adjacent the ceiling 60 so as to increase the space within the interior 58 that may be occupied by cargo.

Figure 3:
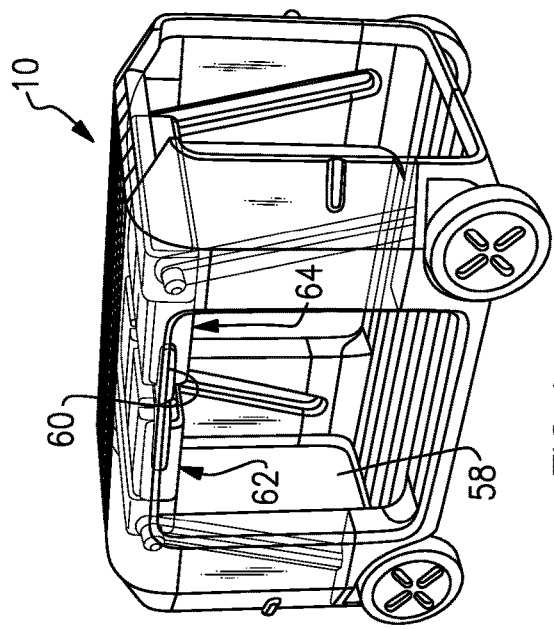
FIG. 3 is a front-perspective view of the vehicle of FIG. 1, and illustrates seat assemblies in a seating position.

With reference to FIG. 3, the vehicle 10 includes two seat assemblies 62, 64. In FIG. 3, the seat assemblies 62, 64 are in the seating position and are configured such that passengers within the interior 58 can use the seat assemblies 62, 64 as seats. In this example, the seat assembly 62 provides first and second seats 66, 68, and the seat assembly 64 provides first and second seats 70, 72. While each of the seat assemblies 62, 64 provides two seats in this example, this disclosure extends to seat assemblies 62, 64 which provide one or more seats.

Figure 4:
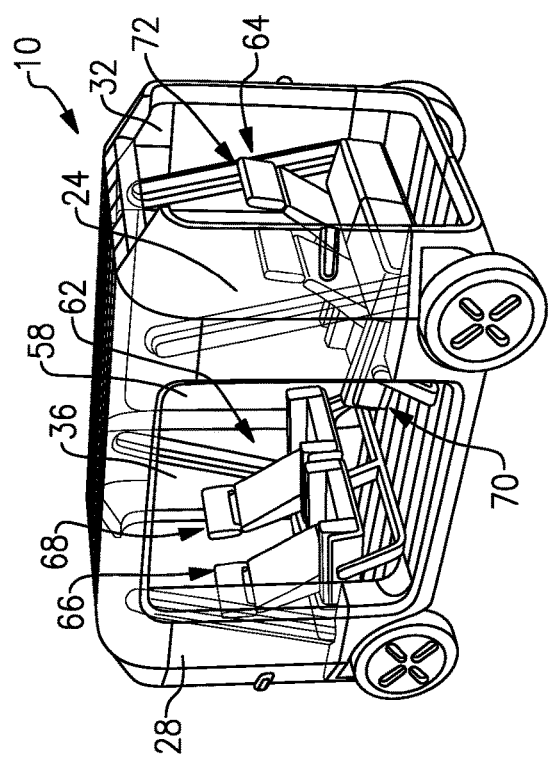
FIG. 4 is a front-perspective view of the vehicle of FIG. 1, and illustrates seat assemblies in a stowed position.

The seat assembly 62 extends generally between the pillars 28, 36, and the seat assembly 64 extends generally between the pillars 24, 32. The seat assemblies 62, 64 are moveable along a respective set of pillars 24, 28, 32, 36, in this example. Specifically, the seat assemblies 62, 64 are able to be moved by being raised and lowered along a linear path of movement between the seating position of FIG. 3 and the stowed position of FIG. 4. The linear path of movement is a substantially straight line and does not involve pivoting the seat assemblies 62, 64 as they move vertically toward the stowed position. In the stowed position, the seat assemblies 62, 64 are adjacent the ceiling 60 and do not occupy significant space within the interior 58. As such, the interior 58 can be filled with items for transport such as cargo.

Figure 6:
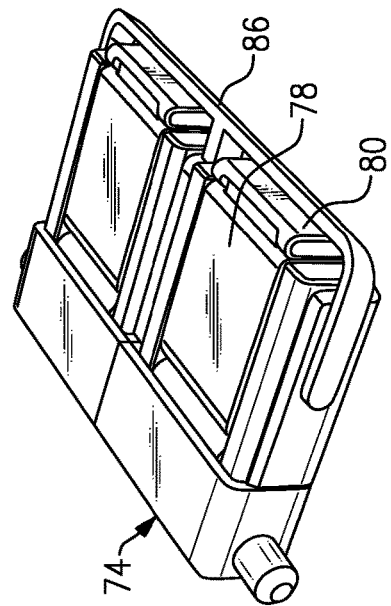
FIG. 6 is a front-perspective view of the example seat assembly in a folded position.
Figure 5:
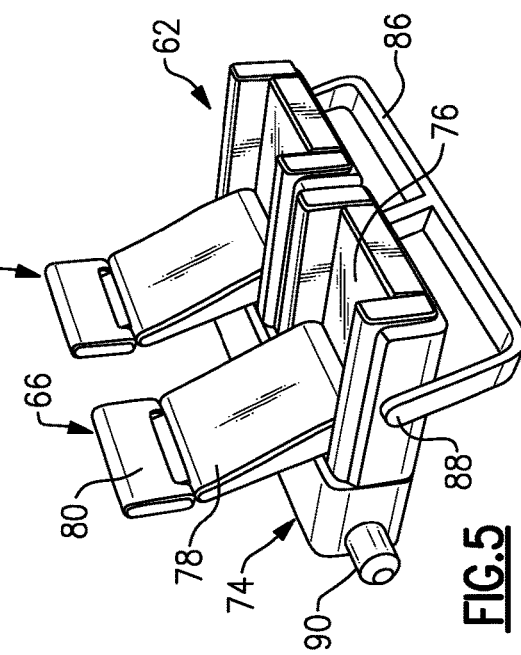
FIG. 5 is a front-perspective view of an example seat assembly in a seating position.
Figure 7:
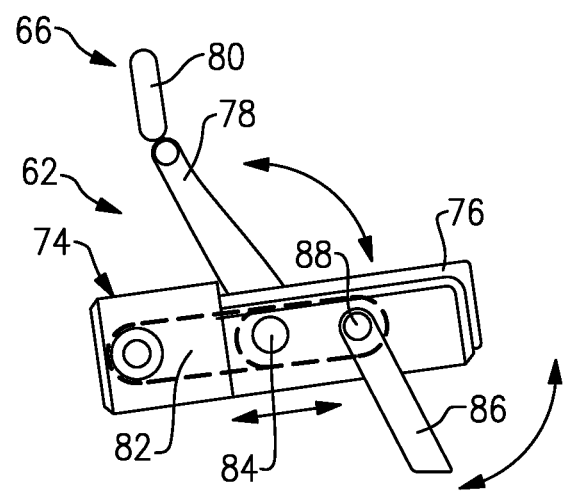
FIG. 7 is a side view of the example seat assembly.

FIGS. 5-7 illustrate the seat assembly 62 in greater detail. It should be understood that the seat assembly 64 is arranged and functions substantially similarly. In general, the seat assembly 62 includes first and second seats 66, 68 and a frame 74. Reference will now be made to the first seat 66, but it should be understood that each of the first and second seats 66, 68 are configured similarly and are mounted relative to the frame 74 similarly.

The first seat 66 includes a seat base 76 and a seat back 78. A headrest 80 is attached to the seat back 78. While not shown, a seatbelt may be incorporated into the seat base 76 and/or seat back 78. The seat back 78 is moveable relative to the seat base 76 such that, in the seating position, a user may sit on the first seat 66 and, in the stowed position, the seat back 78 is substantially parallel to the seat base 76.

An example movement of the seat back 78 relative to the seat base 76 will now be described. In the example, moving the seat back 78 from the upright position of FIG. 5 to the folded position of FIG. 6 includes pivoting and sliding the seat back 78 relative to the seat base 76. The frame 74 includes a slot 82 (FIG. 7) configured to receive a portion of the seat back 78 when the seat back 78 is folded toward the seat base 76. Further, the seat back 78 is connected to the frame 74 via a connection 84 (FIG. 7) which permits the seat back 78 to both pivot relative to the seat base 76 and slide along the slot 82. Further, when the seat back 78 is in the folded position, the headrest 80 can be independently folded and, when folded, the headrest 80 exhibits a height dimension less than or equal to that of the frame 74. Moving the seat assembly 62 to the folded position as described provides a compact arrangement, which increases the useable interior space of the vehicle 10 when the seat assemblies 62, 64 are in the stowed position.

Adjacent the seat base 76, the frame 74 includes a moveable stand 86 configured to contact the floor 20 in the seating position, in order to support the seat assembly 62 relative to the floor 20, and to a cover a portion of the seat, namely a portion of the headrest 80, in the stowed position to protect the headrest 80, for example. The stand 86 is configured to pivot about a point 88 in-line with the seat base 76 in this example so that the stand 86 is able to better resist loads on the seat base 76.

Figure 8:
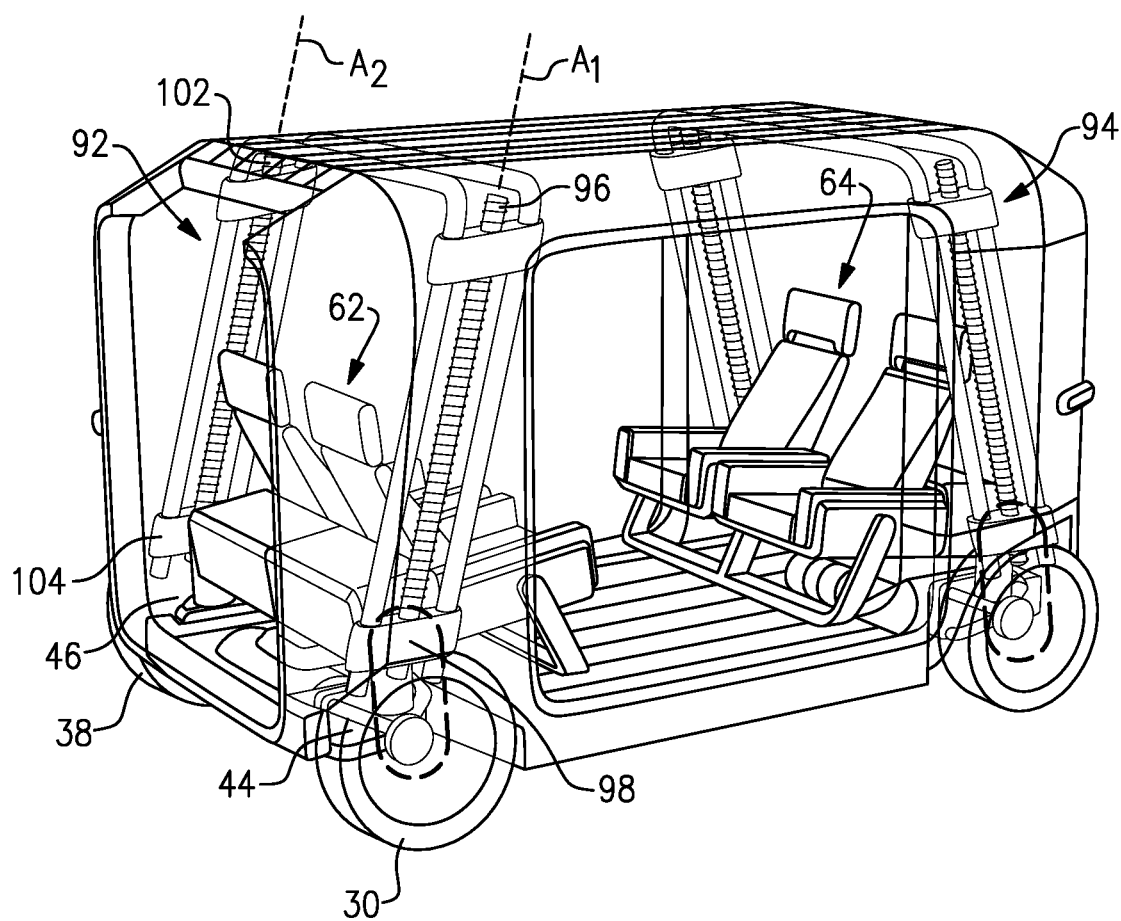
FIG. 8 is a rear-perspective view of the vehicle of FIG. 1 and illustrates example lift assemblies.

With reference to FIG. 5, the frame 74 includes a side anchor 90 configured for attachment to a lift assembly through a track, or slot, in pillar 28. The lift assembly is configured to raise and lower the seat assembly 62 along a liner path of movement. FIG. 8 illustrates an example lift assembly 92 configured to raise and lower the seat assembly 62. The vehicle 10 also includes a substantially similar lift assembly 94 which is configured to raise and lower the seat assembly 64 along a linear path of movement. The lift assembly 92 will be described now in greater detail but it should be understood that the lift assembly 94 includes substantially similar components and functions in substantially the same manner.

The lift assembly 92 includes, in this example, a shaft 96 within the pillar 28 having a central axis $A_1$ arranged along the linear path of movement, and a carriage 98 connected to the seat assembly 62 via the anchor 90. The shaft 96 extends from a point adjacent the floor 20 to a point adjacent the roof 22. The shaft 96 is threaded and is rotatable about its central axis $A_1$ by the motor 44. The motor 44 is the same motor that is able to drive the drive wheel 30. The motor 44 is configurable to selectively engage the drive wheel 30 and the shaft 96. As the shaft 96 rotates, the carriage 98 is configured to travel along the shaft 96, resulting in either the raising or lowering of the seat assembly 62 depending on the direction of rotation of the shaft 96. A similar shaft 102 and carriage 104 are arranged within the pillar 36. The carriage 104 is connected to the opposite side of the frame 74 as the carriage 98. The shaft 102 is threaded and rotatable about its central axis $A_2$ by motor 46, which, like motor 44, is able to selectively engage the drive wheel 38 or the shaft 102. While an example lift assembly has been shown and described, this disclosure extends to other types of lift assemblies.

The electric motors 44, 46 may be able to effect folding and unfolding of the seat backs 78, headrests 80, and may further be able to move the stand 86. Alternatively, the seat backs 78, headrests 80, and the stand 86 may be moveable manually.

Figure 9:
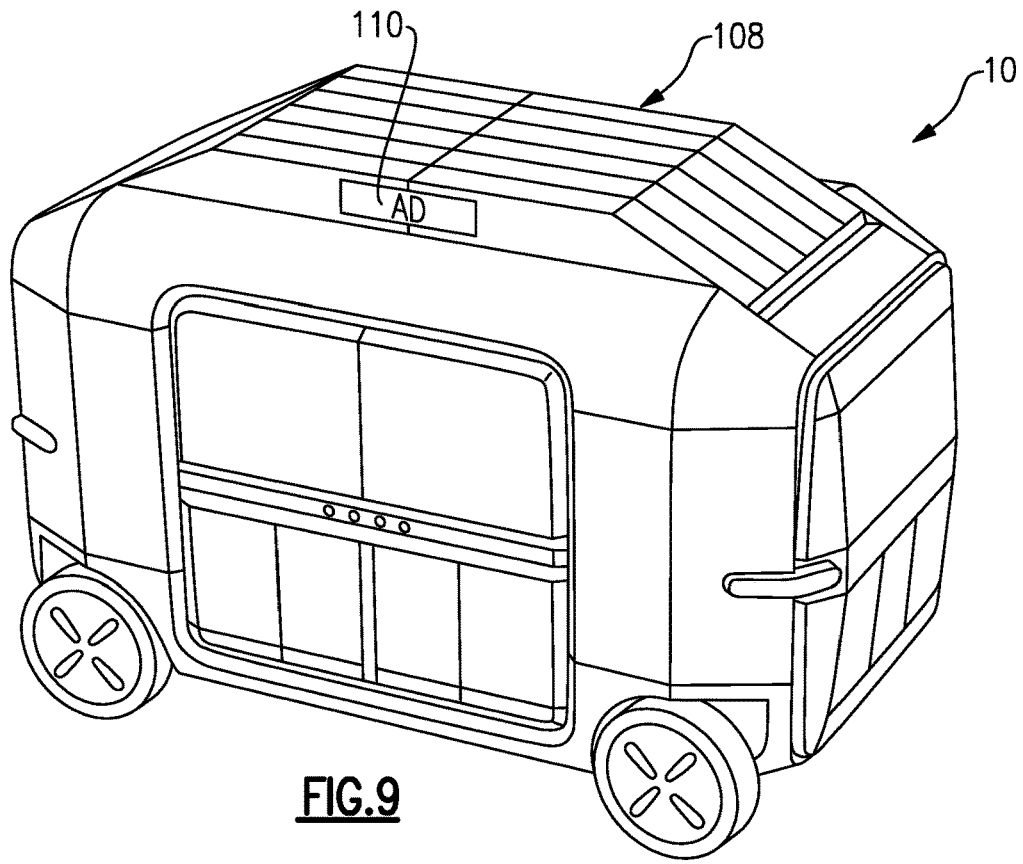
FIG. 9 is a top-perspective view of another example vehicle.
Figure 10:
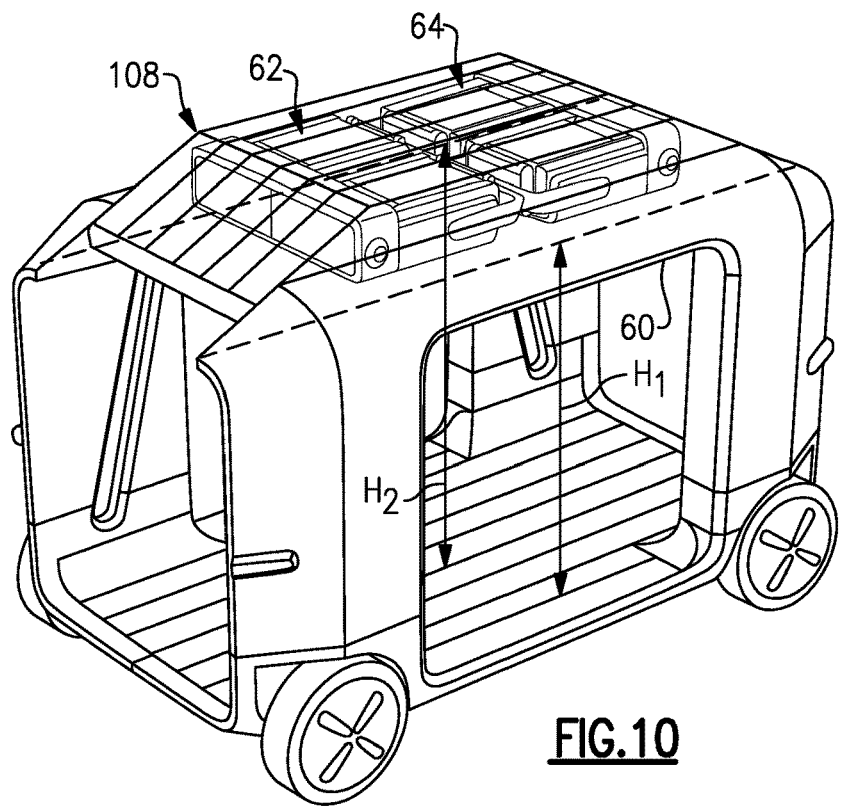
FIG. 10 is a rear-perspective view of the vehicle of FIG. 9 with seat assemblies in a stowed position.

With reference to FIGS. 9 and 10, in an embodiment, the ceiling 60 of the vehicle 10 includes a raised section 108 providing the interior space 58 with an increased height dimension relative to a remainder of the ceiling 60. As a reference, other than the raised section 108, the ceiling exhibits a height dimension $H_1$. In the embodiment of FIG. 1, nearly the entire ceiling 60 exhibits the height dimension $H_1$. In FIGS. 9 and 10, the raised section 108 provides the interior space with a greater height dimension $H_2$. The raised section 108 is sized and shaped to accommodate the seat assemblies 62, 64 when the seat assemblies 62, 64 are in the stowed position. The raised section 108 is further sized and shaped such that, in the stowed position, the seat assemblies 62, 64 sit substantially flush with the remainder of the ceiling 60 other than the raised section 108. In other words, bottom surfaces of the seat assemblies 62, 64 lie substantially flush with the upper boundary of the height dimension $H_1$.

The linear paths of movement, along axes $A_1$, $A_2$, of the seat assemblies 62, 64 are inclined relative to a true vertical direction at a non-zero, acute angle in this example. Further, the axes $A_1$, $A_2$ are inclined toward a center of the interior 58 of the vehicle 10. The inclined linear paths of movement facilitate movement of the seat assemblies 62, 64 into the raised section 108. Further, movement along the inclined linear paths toward the stowed position moves the seat assemblies 62, 64 away from the openings 50, 52, which prevents interference between the seat assemblies 62, 64 and a door associated with the openings 50, 52 or users/items entering the openings 50, 52.

Further, the raised section 108 provides additional surface area on an exterior of the vehicle 10. That surface area may include one or more displays 110, such as electronic screens, which may display an advertisement or other message to persons outside the vehicle 10.

Figure 12:
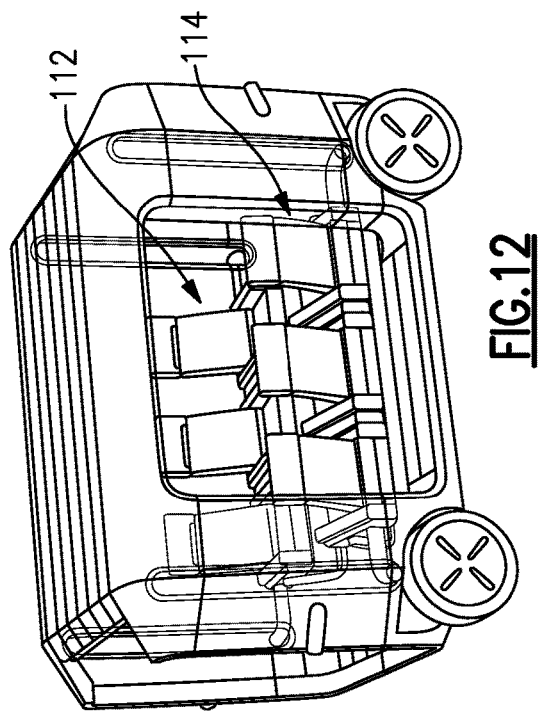
FIG. 12 is a side-perspective view of the vehicle of FIG. 11 with the seat assemblies in a seating position.
Figure 13:
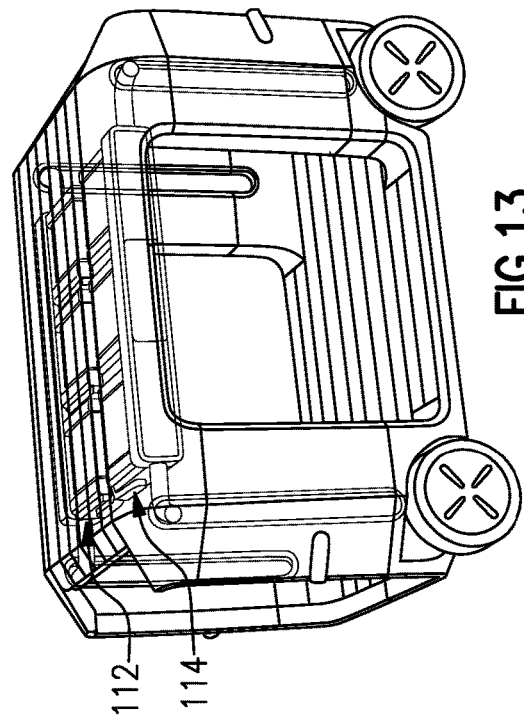
FIG. 13 is a side-perspective view of the vehicle of FIG. 11 with the seat assemblies in a stowed position.
Figure 11:
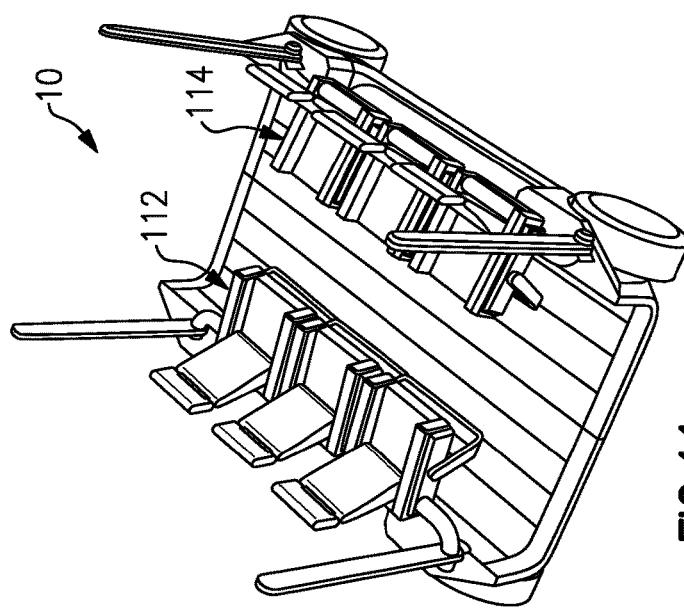
FIG. 11 is a partial, rear-perspective view of an example vehicle including another seat assembly arrangement.

FIGS. 11-13 illustrate another example arrangement of seat assemblies 112, 114. The seat assemblies 112, 114 are configured substantially similar to the seat assemblies 62, 64, except that the seat assemblies 112, 114 include three seats each and are arranged along a line extending parallel to a centerline of the vehicle 10, whereas the seat assemblies 62, 64 extend along lines perpendicular to the centerline. Further, the seat assemblies 112, 114 are moveable to the stowed position along linear paths of movement which are not inclined. The seat assemblies 112, 114 free a center aisle of the vehicle 10, which may be desirable in some circumstances. The seat assemblies 112, 114 are configured to raise and lower using lift assemblies similar to those described relative to the seat assemblies 62, 64, with the exception of the linear path of movement being arranged vertically and not inclined.

Figure 15:
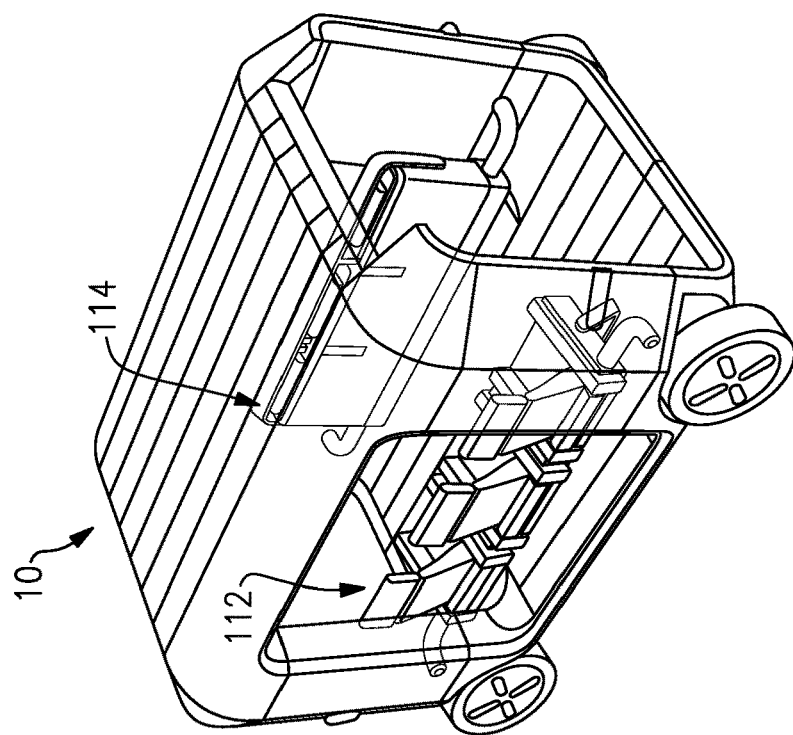
FIG. 15 is a front-perspective view of another example vehicle with seat assemblies moveable to a different stowed position.
Figure 14:
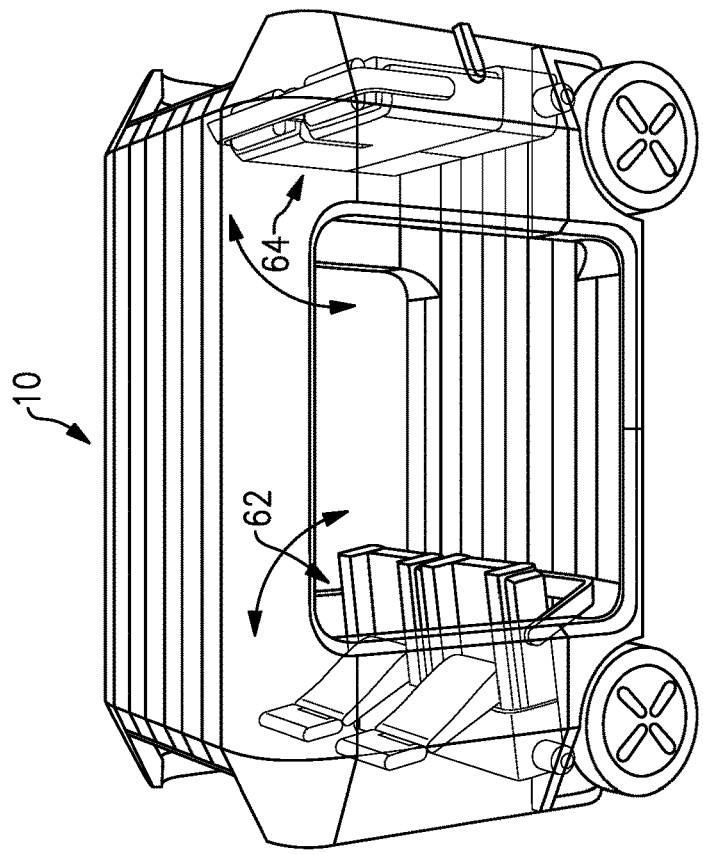
FIG. 14 is a top-perspective view of another example vehicle with seat assemblies moveable to a different stowed position.

While the seat assemblies 62, 64, 112, 114 are configured to move to a stowed position which is adjacent the ceiling 60 of the vehicle 10, in another aspect of this disclosure, the seat assemblies 62, 64, 112, 114 are configured to move to a stowed position by being folded and not vertically raised, as shown in FIGS. 14 and 15. In FIG. 14, the seat assembly 62 is shown in a seating position and the seat assembly 64 is shown in a stowed position. Likewise, in FIG. 15, the seat assembly 112 is shown in a seating position and the seat assembly 114 is shown in a stowed position. These designs may be mechanically simpler, and thus more easily executed than the aforementioned designs. However, the configurations of FIGS. 14 and 15 have the disadvantage of the seat assemblies blocking two of the openings 50, 52, 54, 56 in both the seating positions and stowed positions.

Figure 16:
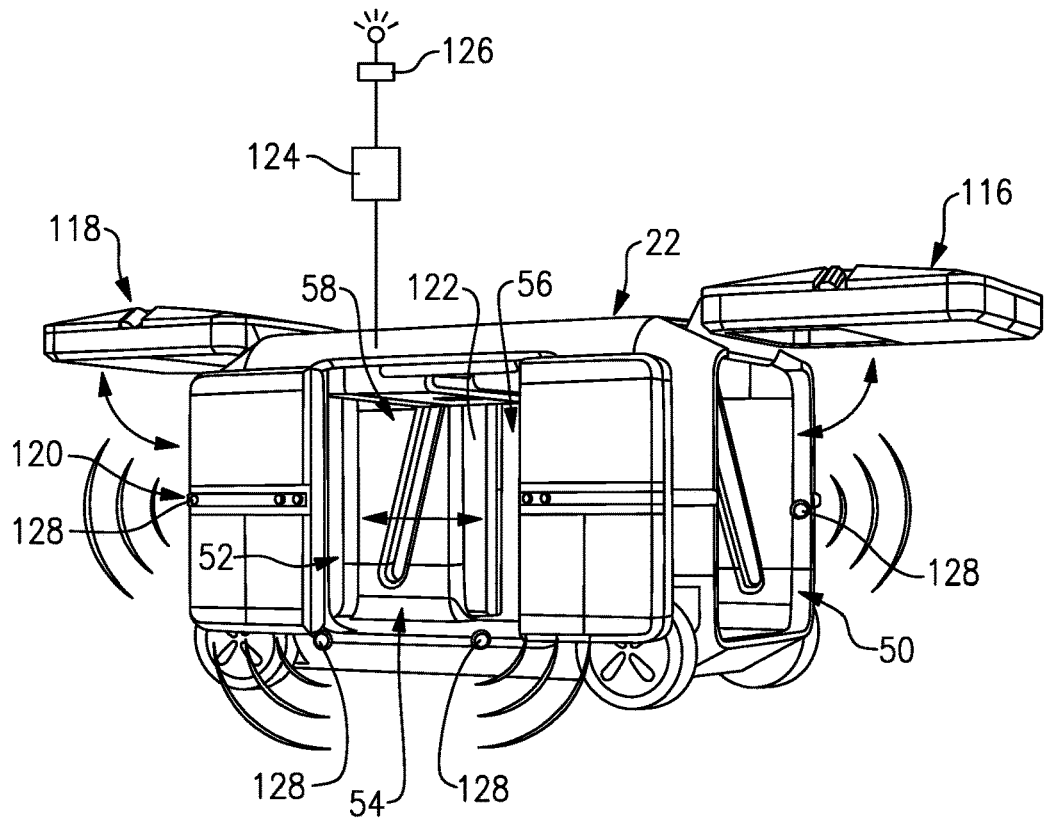
FIG. 16 is a side-perspective view of an example vehicle and illustrates a first door configuration with doors of the vehicle in an open position.
Figure 17:
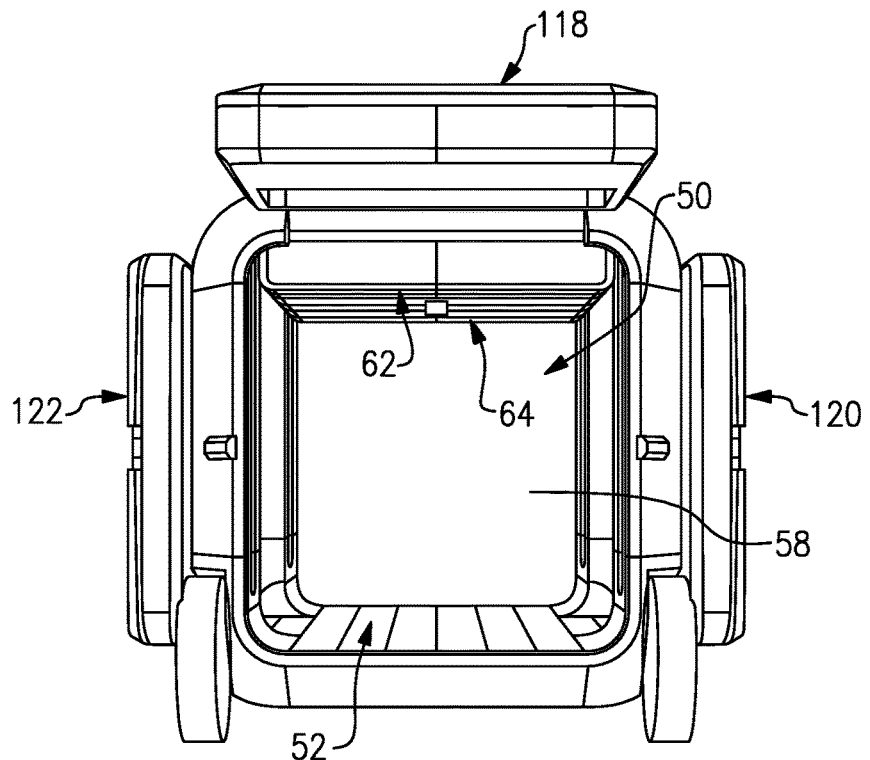
FIG. 17 is an end view of the vehicle of FIG. 16.

Another aspect of this disclosure relates to the doors of the vehicle 10. With reference to FIGS. 16 and 17, in an example the vehicle 10 includes a front door 116 configured to open and close relative to the front opening 50, a rear door 118 configured to open and close relative to the rear opening 52, a first side door 120 configured to open and close relative to the first side opening 54, and a second side door 122 configured to open and close relative to the second side opening 56. Each of the doors 116, 118, 120, 122 is configured to open and close to selectively provide access to the interior space 58 via a corresponding opening and to enclose the corresponding opening, respectively.

In FIGS. 16 and 17, each of the doors 116, 118, 120, 122 is open and the seat assemblies 62, 64 are in the stowed position. As such, nearly the entire interior 58 can be filled with items such as cargo for transport. Since the interior 58 is accessible from four sides of the vehicle 10 simultaneously, the interior 58 can be loaded and unloaded efficiently.

The doors 116, 118, 120, 122 may be powered doors openable and closeable by one or more mechanisms and without requiring any force being applied by the user other than, potentially, the user pressing an input button such as a button on a keyfob or mobile device, for example. In a further example, the 116, 118, 120, 122 are configured to open and close simultaneously in response to a single input. In this example, a controller 124 of the vehicle 10 is in communication with a transceiver 126 which is able to detect a presence of a door open signal or a door close signal. The signal may be initiated by an input button on a keyfob or mobile device of a user, as examples. The signal may also be initiated by another human-machine interface, such as a touchscreen associated with the vehicle 10. The signal may also be initiated automatically, such as by opening the doors automatically when dropping a rider off at a destination, or such as by opening the doors automatically upon detection of a keyfob or mobile device within a certain range of the vehicle 10. The signal may indicate which of the doors 116, 118, 120, 122 should be opened. For instance, the signal could include an "open all doors" command or a "close all doors" command. The signal could be voice activated such that the doors 116, 118, 120, 122 are configured to simultaneously open and close in response to a verbal command of "open all doors" or "close all doors," respectively. The vehicle 10 may include a plurality of sensors 128 configured to detect the presence of objects adjacent the doors 116, 118, 120, 122 to partially or fully override the open and close commands. In an example, in response to an "open all doors" command, the vehicle 10 will attempt to open all doors but may open fewer than all doors if objects are blocking one or more of the doors. For example, three doors may open if an object blocks one door.

The controller 124 is configured to receive information from the transceiver 126 and the sensors 128, and is further configured to interpret that information and issue commands to various components of the vehicle 10 such as the actuators of the doors 116, 118, 120, 122 based on that information. The controller 124 is shown schematically. It should be understood that the controller 124 may include hardware and software, and could be part of an overall vehicle control module, such as a vehicle system controller (VSC), or could alternatively be a stand-alone controller separate from the VSC. Further, the controller 124 may be programmed with executable instructions for interfacing with and operating the various components of the vehicle 10. The controller 124 additionally includes a processing unit and non-transitory memory for executing the various control strategies and modes of the vehicle system.

The sensors 128 may be provided by image sensors, such as cameras, radio detecting and imaging (RADAR) sensors, LIDAR sensors, and wireless sensors systems utilizing Bluetooth® low energy (BLE) technology, as examples. Further, the sensors 128 could be part of an SDS and can double as sensors capable of detecting the presence of objects for purposes of potentially overriding a door open/close command after receipt of a door open/close command. The locations of the sensors 128 in FIG. 16 are exemplary only.

The doors 116, 118 are each provided by a single panel, which may include a window, arranged adjacent ends of the vehicle 10 and pivotably attached adjacent the roof 22 of the vehicle 10. As such the doors 116, 118 are configured to pivot between the open and closed position. The doors 120, 122 each include two panels, such as panels 120A, 120B, configured to slide away from one another and toward one another between the open and closed positions, respectively.

Figure 18:
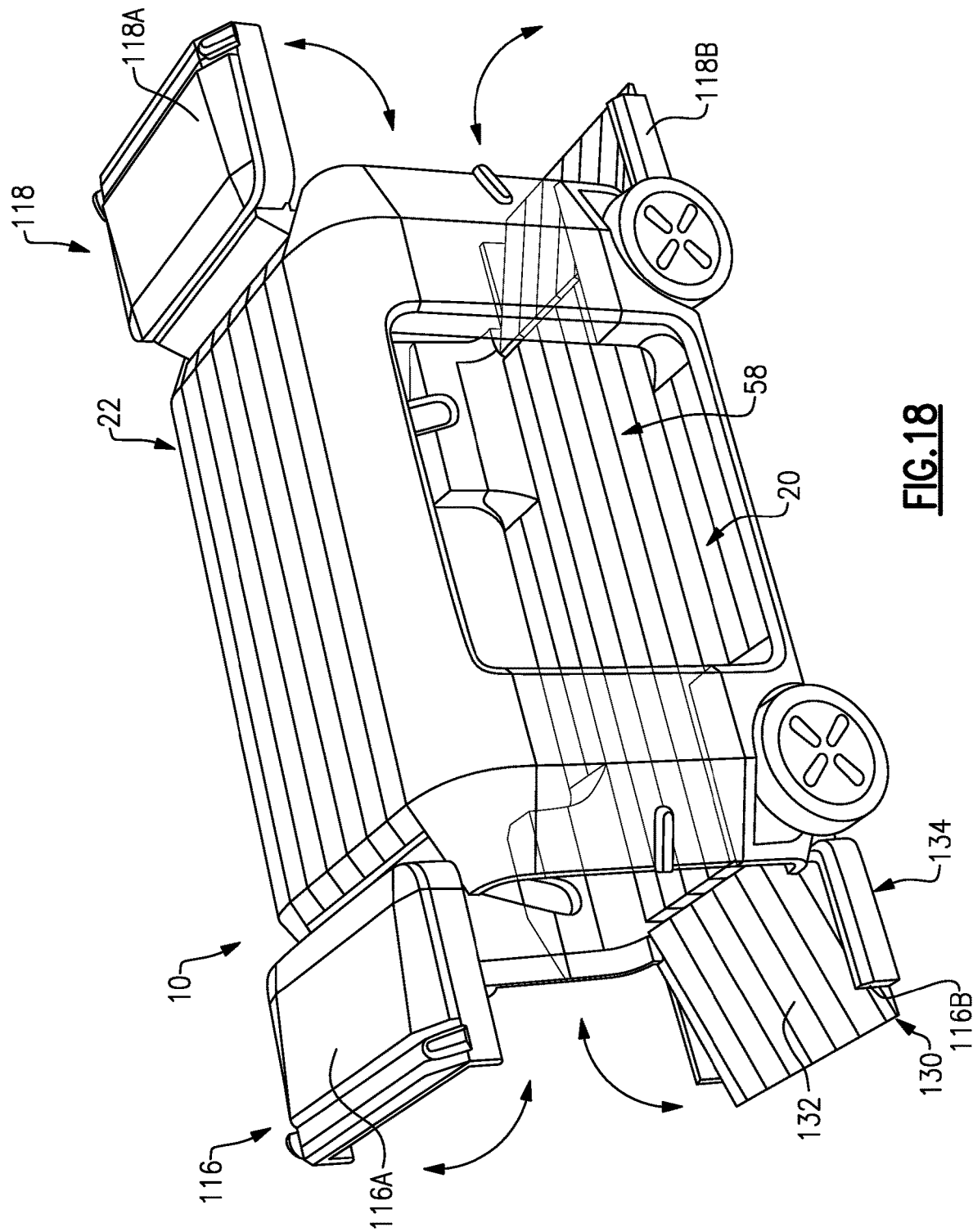
FIG. 18 is a top-perspective view of an example vehicle and illustrates a second door configuration with doors of the vehicle in an open position.

In another example, shown in FIG. 18, the doors 116, 118 each include two panels. With reference to the door 116, the door 116 includes a first panel 116A and a second panel 116B. The first panel 116A is pivotably attached to the body of the vehicle 10 adjacent the roof 22 of the vehicle 10 and the second panel 116B is pivotably attached to the body of the vehicle 10 adjacent the floor 20. In the open position of FIG. 18, an end 130 of the second panel 116B opposite the floor 20 contacts a ground surface. Further, the upper surface 132 of the second panel 116B, which faces the interior when the door 116 is closed, provides an inclined ramp having a gradual incline between a ground surface and the floor 20 to assist with loading and unloading items relative to the interior 58. A lower surface 134 of the second panel 116B may include a wedge-shaped feature, which either replaces or covers storage compartments and otherwise protects the second panel 116B, contacting the ground surface to resist deflection from heavier loads on the upper surface 132. In other words, the lower surface 134 may contact the ground surface at locations other than the end 130 and, in some examples, along substantially the entire distance between the end 130 and the connection point with the floor 20. It should be understood that the door 118 is arranged similarly. The split pivoting panel arrangement of the doors 116, 118 facilitates loading and also reduces the clearance necessary to open the doors 116, 118.

One or more of the doors 116, 118, 120, 122 may include one or more storage bins nestable within the doors 116, 118, 120, 122. In this example, each of the doors 116, 118, 120, 122 includes a plurality of storage bins. The storage bins may be selectively lockable and unlockable to permit secure delivery and shipment of various items. The storage bins are accessible from an exterior of the vehicle 10 by users, namely persons receiving a delivery or shipping an item, as examples. The storage bins may be in use when the interior 58 of the vehicle 10 is used to transport passengers or cargo. Further, storage bins are not required in all examples.

Figure 19:
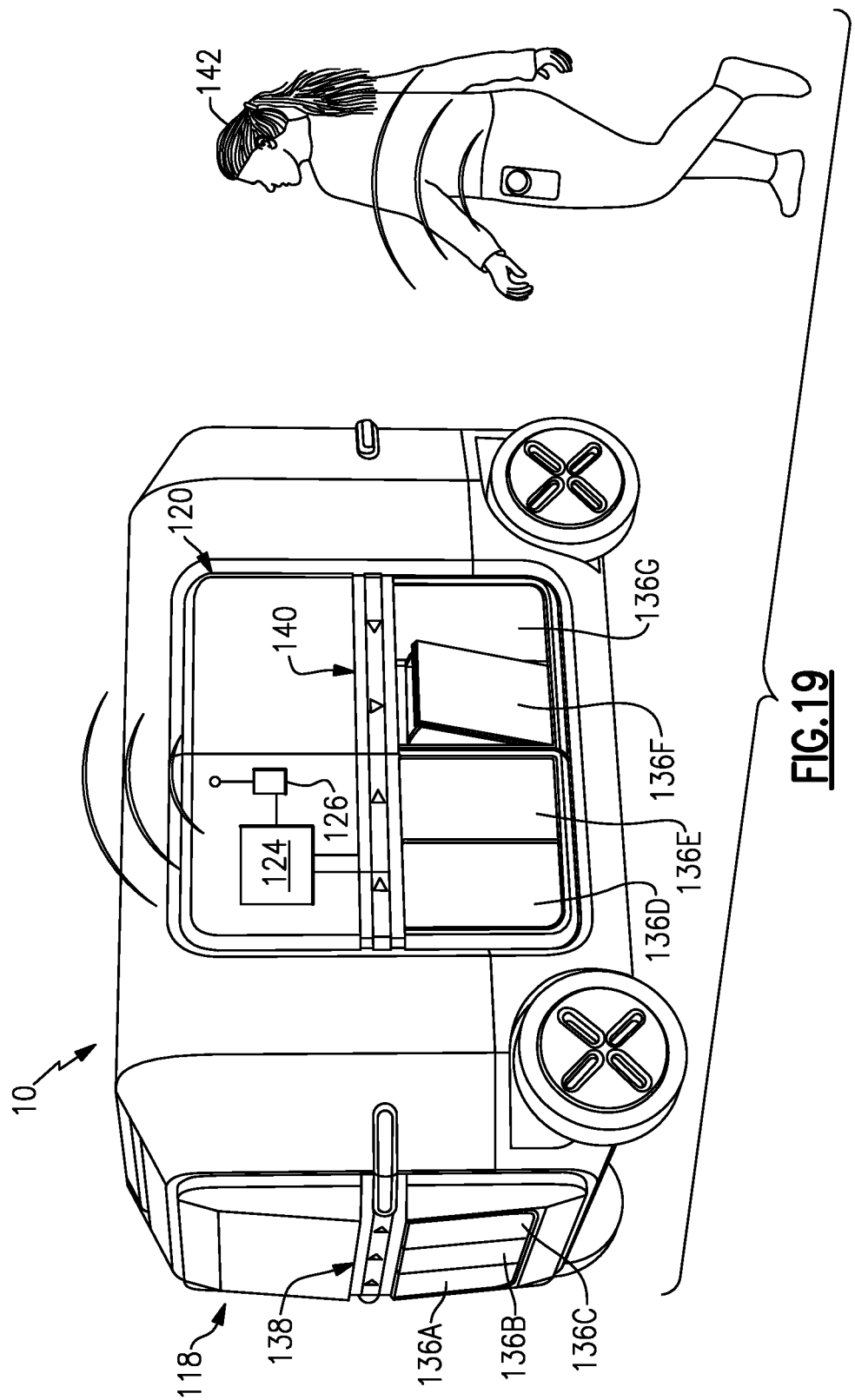
FIG. 19 is a rear-perspective view of an example vehicle and illustrates an aspect of this disclosure pertaining to storage bins.

With reference to the example of FIG. 19, the vehicle 10 includes a plurality of storage bins. In this example, the door 118 includes three storage bins 136A-136C and the door 120 includes four storage bins 136D-136G. The door 116 also includes three storage bins, and the door 122 includes four storage bins. The doors 120, 122 include two storage bins per panel. In particular, the panel 120A includes two storage bins 136D, 136E, and the panel 120B includes two storage bins 136F, 136G.

With reference to the storage bin 136F, which is representative of the remainder of storage bins, the storage bin 136F is pivotable about an axis adjacent a bottom of the storage bin 136F and extending in a direction parallel to a face of the door 120. When opened, an upper portion of the storage bin 136F partially projects outward from the remainder of the door 120 and permits a user to access the interior of the storage bin 136F from above. The storage bin 136F is not accessible from the interior 58 in some examples. The storage bin 136F may be lockable and moveable by one or more mechanisms which are controlled in response to instructions from the controller 124. In an example, as a user approaches the vehicle 10, the transceiver 126 receives an input signal or detects the presence of a keyfob or mobile device of a user attempting to send or receive a package. Once authenticated, the controller 124 opens the storage bin 136F corresponding to that user.

In an aspect of this disclosure, the doors 116, 118, 120, 122 incorporate a display system configured to direct users to the appropriate storage bin. As shown in FIG. 19, a relatively thin display screen 138 extends along a width of the door 118, and another relatively thin display screen 140 extends along a width of the door 120. The doors 116, 122 also include similar display screens. Each storage bin 136A-136G has a portion of one of the display screens 138, 140 vertically above it such that a particular portion of a display screen can readily indicate an appropriate one of the storage bins 136A-136G.

In this example, an arrow symbol illuminates over each of the storage bins 136A-136G directing the user 142 to the storage bin 136F containing the items of the user 142. Specifically, a left-pointing arrow is above the storage bin 136G, a down-pointing arrow is above the storage bin 136F, and right-pointing arrows are above the storage bins 132A-132E. Thus, the user 142 is lead to storage bin 136F. While arrows are mentioned, other symbols or cues may be used.

It should be understood that terms such as "about," "substantially," and "generally" are not intended to be boundaryless terms, and should be interpreted consistent with the way one skilled in the art would interpret those terms. It should also be understood that terms such as "forward," "rear," "side," etc., are used herein relative to the normal operational attitude of the autonomous vehicle 10 for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A vehicle, comprising:
    a body including a front, a rear, and opposed first and second sides extending between the front and the rear, wherein the front of the body has a front opening, the rear of the body has a rear opening, the first side has a first side opening, and the second side has a second side opening;
    an interior space within the body;

a front door configured to open and close relative to the front opening;

a rear door configured to open and close relative to the rear opening;

a first side door configured to open and close relative to the first side opening;

a second side door configured to open and close relative to the second side opening;

a plurality of storage bins incorporated into one or more of the front door, rear door, and first and second side doors, wherein the storage bins are configured to hold items and are further configured such that an item in the storage bin is accessible from an exterior of the vehicle when the corresponding one of the front door, rear door, first side door, or second side door is closed, and wherein each of the front door, rear door, and first and second side doors includes a plurality of storage bins.

2. The vehicle as recited in claim 1, wherein the vehicle includes a controller configured to command each of the front door, the rear door, and the first and second side doors to open in response to a single input.

3. The vehicle as recited in claim 1, wherein the front door and the rear door are each provided by one panel pivotably attached adjacent a roof of the vehicle.

4. The vehicle as recited in claim 1, wherein the front door and the rear door are each provided by a first panel pivotably attached adjacent a roof of the vehicle and a second panel pivotably attached adjacent a floor of the vehicle.

5. The vehicle as recited in claim 4, wherein, when the front and rear doors are open, each of the second panels is configured to provide a substantially flat inclined ramp between the ground surface and the interior space.

6. The vehicle as recited in claim 1, wherein the first side door and the second side door are each provided by first and second panels configured to slide away from one another to open a respective one of the first and second doors.

7. A vehicle, comprising:

a body including a front, a rear, and opposed first and second sides extending between the front and the rear, wherein the front of the body has a front opening, the rear of the body has a rear opening, the first side has a first side opening, and the second side has a second side opening;

an interior space within the body;

a front door configured to open and close relative to the front opening;

a rear door configured to open and close relative to the rear opening;

a first side door configured to open and close relative to the first side opening;

a second side door configured to open and close relative to the second side opening;

a plurality of storage bins incorporated into one or more of the front door, rear door, and first and second side doors, wherein the storage bins are configured to hold items and are further configured such that an item in the storage bin is accessible from an exterior of the vehicle; and a display system including a front display screen mounted to the front door, a rear display screen mounted to the rear door, a first side display screen mounted to the first side door, and a second side display screen mounted to the second side door, wherein the display system is configured to indicate to a user which one of the storage bins is associated with the user.

8. The vehicle as recited in claim 1, wherein the vehicle is an autonomous vehicle.

9. The vehicle as recited in claim 1, wherein:

the front door and the rear door are each provided by a first panel pivotably attached adjacent a roof of the vehicle and a second panel pivotably attached adjacent a floor of the vehicle, and the first side door and the second side door are each provided by first and second panels configured to slide away from one another to open a respective one of the first and second doors.

* * * * *